United States Patent

[11] 3,523,565

| | | |
|---|---|---|
| [72] | Inventor | Bruce E. Olsen<br>Westchester, Illinois |
| [21] | Appl. No. | 724,790 |
| [22] | Filed | April 29, 1968 |
| [45] | Patented | Aug. 11, 1970 |
| [73] | Assignee | Allied Products Corporation<br>Chicago, Illinois<br>a Corp. of Illinois |

[54] SELF LOCKING MALE THREADED FASTENER
2 Claims, 8 Drawing Figs.

[52] U.S. Cl............................................... 151/22,
10/2, 10/10
[51] Int. Cl...................................................... F16b 39/30
[50] Field of Search............................................ 151/22,
21B, 21A&C, 14; 10/10, 86A, 2

[56] References Cited
UNITED STATES PATENTS

| 243,493 | 6/1881 | Bloom.............................. | 151/21(C)UX |
| 1,626,863 | 5/1927 | Nacey............................ | 151/21(C)UX |
| 1,660,455 | 2/1928 | Plumb........................... | 151/21(C)UX |
| 2,177,004 | 10/1939 | Purtell............................ | 151/22 |

Primary Examiner— Ramon S. Britts
Attorney—Greist, Lockwood, Greenawalt and Dewey ABSTRACT: Self locking male threaded fastener having shank portions provided with standard V-shaped thread forms with axially aligned flank portions of at least two adjacent threads deformed in opposite axial or longitudinal directions so as to have opposing, mirror image, generally epicycloidal concave surfaces. These surfaces provide the self locking action and if desired there may be a plurality of such surfaces axially spaced along the threaded shanks. The self locking epicycloidal concave surfaces are formed during the thread rolling action by means of an insert in the die having a projecting working surface which in a direction transverse to the threads (i. e. coaxial with the shank) preferably has a radius of curvature between about one-half to about one thread pitch, and which in a direction generally transverse to the longitudinal axis has a radius of curvature approximately two times the major diameter of the threads.

Patented Aug. 11, 1970
3,523,565
Sheet 1 of 2
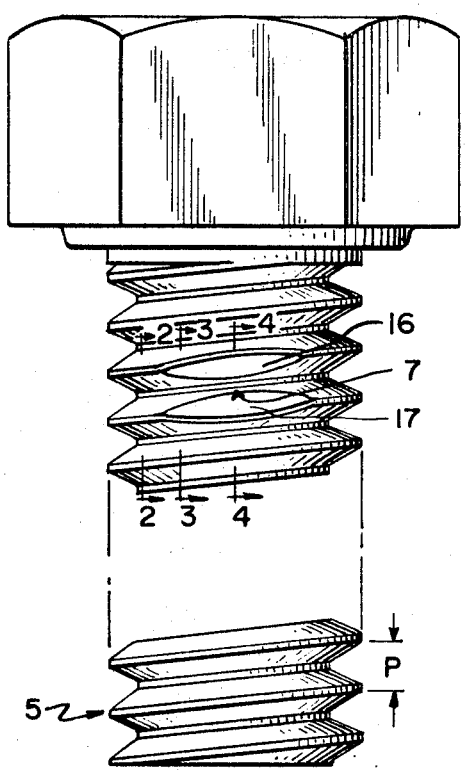
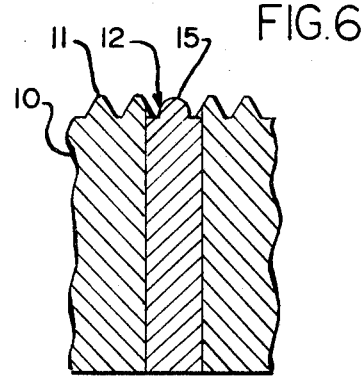
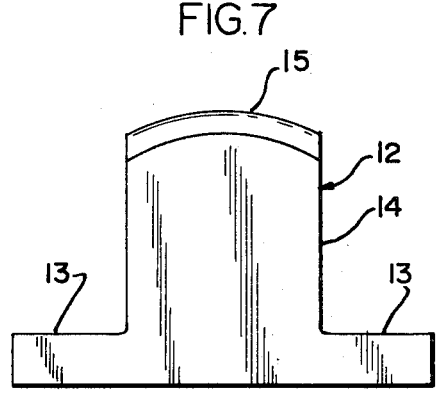
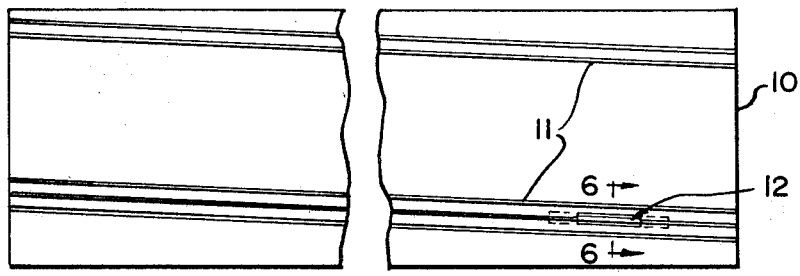
INVENTOR
BRUCE E. OLSEN
BY Greist, Lockwood, Greenawalt & Dewey.
ATTORNEYS.

Patented Aug. 11, 1970

INVENTOR.
BRUCE E. OLSEN
BY Greist, Lockwood, Greenawalt & Dewey
ATTORNEYS.

SELF LOCKING MALE THREADED FASTENER

The object of the present invention, generally stated, is the provision of self locking male threaded fasteners characterized by: their ease and economy of manufacture; self locking action provided by opposing, mirror image generally epicycloidal concave surfaces on axially aligned flank portions of at least two adjacent threads; and, self locking action which allows the fasteners to be driven and removed with a predetermined increased driving and removal torques a plurality at times.

Certain other objects of the invention will in part be obvious, and will in part appear hereafter.

For a more complete understanding of the nature and scope of the invention reference may now be had to the following detailed description thereof taken in connection with the accompanying drawings in which:

FIG. 1 is an elevational view of a bolt constituting one embodiment of the invention;

FIGS. 2, 3 and 4 are radial sectional views taken on lines 2-2, 3-3 and 4-4, respectively of FIG. 1 and on magnified scale;

FIG. 5 is a plan view of a thread rolling die having a special insert by means of which the embodiment of FIG. 1 may be formed;

FIG. 6 is a fragmentary sectional view on enlarged scale taken on line 6-6 of FIG. 5;

Figure 8:
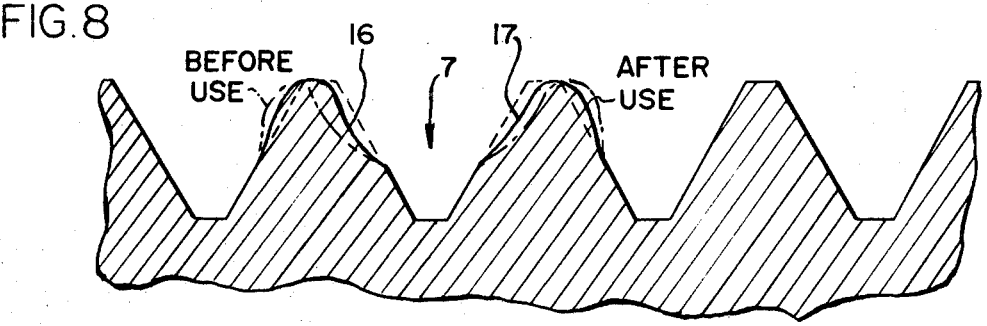

FIG. 7 is an elevational view of the insert taken at right angles to FIG. 6; and FIG. 8 is a composite view, on enlarged scale, taken on a line corresponding generally to line 4-4 of FIG. 1 and showing in superimposed relationship a standard V-thread form, the thread form of the embodiment of FIG. 1 as manufactured and prior to useage, and the profile of the thread form in the self locking portion subsequent to usage.

Referring to FIG. 1 a bolt is shown therein having a shank portion 5 and a head 6. The shank portion has standard V-shaped threads formed or rolled thereon in known manner. For example, these threads may conform to Unified Screw Thread Standards, USASI - B1.1.

The shank 5 is provided with at least one self locking formation which is indicated in FIG. 1 generally at 7. The present invention is concerned with the particular configuration and method of forming this self locking formation 7.

The details of configuration of the self locking formation 7 will be best and most readily understood by first having reference to the thread rolling die and special insert shown in FIGS. 5- 7. In FIG. 5 a thread rolling die 10 is shown which has the conventional thread rolling formation on the surface thereof as indicated at 11. The die formation 11 results in the forming of the standard V-shaped threads as shown on the shank 5 of the bolt in FIG. 1. However, a window is cut into the die 10 for receiving therein a special insert 12 which is shown in enlarged detail in FIGS. 6 and 7.

The insert 12 is T-shaped in side elevation so that the oppositely extending horizontal projections 13-13 limit the entry of the insert into a corresponding T-shaped opening in the die 10. The vertical portion 14 of the insert 12 projects through the opening of corresponding transverse rectangular cross-section. This opening is aligned with one of the V-ridges of the thread rolling die 10. Desirably the insert is located adjacent the end of the die 10 at which the thread rolling operation is completed. This permits the insert to act on opposing flank portions of adjacent performed threads and makes it unnecessary to relieve the die to accommodate the deformed self locking configuration on further rotation of the piece-part.

The working surface of the die insert 12 is indicated at 15 in FIGS. 6 and 7. The surface 15 may be described generally as an arcuate segment of a circular disc the edge of which is also circular in cross-section. While the working surface 15 does not have to be exactly arcuate in cross-section in either direction, this is the preferred configuration.

It has also been found that the radius of curvature of the surface 15 in a transverse direction, as viewed in FIG. 6, is between 1/2 to 1 thread pitch (FIG. 1) of the standard thread of the fastener in FIG. 1. It has been found that if radius of curvature in this transverse direction is less than 1/2 of the pitch of the thread the working or deforming action for producing the self locking configuration 7 is not adequate. On the other hand, if the radius of curvature in this direction exceeds approximately 1 thread pitch, then the deformation tends to be excessive and difficult to control.

The radius of curvature of the working surface 15 of the die insert 12 as viewed in FIG. 7 is also important and preferably is equal to approximately twice the major diameter of the threads of the piece-part.

Figure 2:
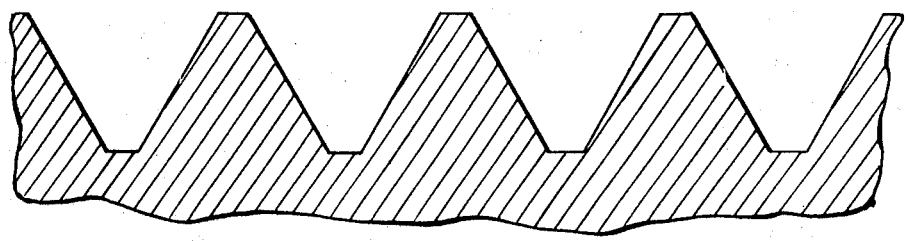
Figure 3:
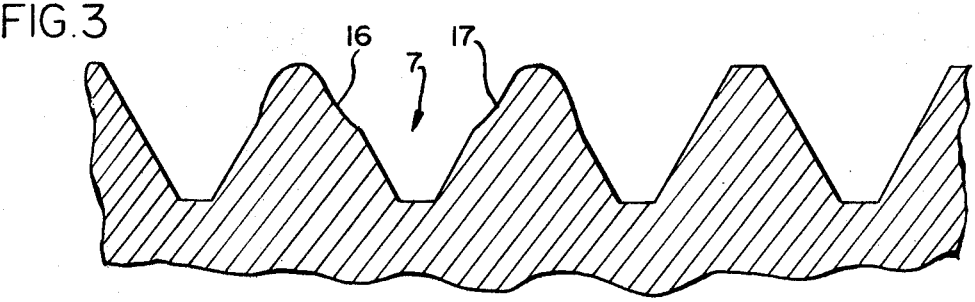
Figure 4:
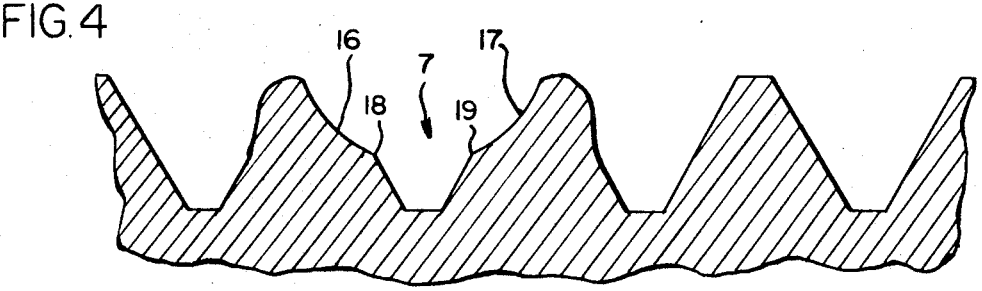

Reference may now be had to FIGS. 2, 3, and 4 for a detailed description of the configuration of the self locking formation 7. In FIG. 2 a profile of the standard V-shaped threads is shown adjacent one end of the self locking formation 7. In FIG. 3 the profile of formation 7 adjacent one end thereof is shown, while in FIG. 4 the profile of the formation midway between the ends is shown.

It will be seen from FIGS. 3 and 4 that axially aligned flank portions of adjacent threads are deformed in opposed axial direction by the working surface 15 of the insert 12. In transverse cross-section the deformed self locking formation is generally concave arcuate with the radius of curvature conforming to that of the transverse radius of the portion 15 of the insert.

The opposed surfaces 16 and 17 of the adjacent flank portions are mirror images and in the embodiment are also symmetrical. Each of the surfaces 16 and 17 is substantially longer circumferentially than wide radially (FIG. 1). The roots or radially innermost portions of the surfaces 16 and 17 terminate radially outwardly of the roots of the V-threads as indicated at 18 and 19, respectively (FIG. 4).

It will be seen that the surfaces 16 and 17 are epicycloidal concave surfaces as a result of the formation in which the shank of the fastener having a relatively small diameter rolls on the arcuate working surface 15 of the insert 12, which has a relatively large radius of curvature as viewed in FIG. 7.

It will be seen that once the die 10 is set up with an insert 12, it may then be used in production for producing fasteners with the self locking formation 7 in conventional thread rolling fixtures and machines, operating at normal capacity as with a conventional thread rolling die. Thus, there is no appreciable increase in the cost of production, with tolerances being readily and accurately controlled over long production runs.

In use, the bolt shown in FIG. 1 has excellent self locking characteristics for many applications. The driving and removal torques may be readily controlled to meet requirements such as by using a plurality of the self-locking formations 7 and/or changes in the particular configuration of the insert working surface 15.

The self locking formation 7 is such as to provide thread interference with the flanks of the standard female threads of a nut or other female threaded parts. Driving the self locking bolt of FIG. 1 into a nut or tapped hole produces a change in the configuration of the self locking formation 7, particularly at the mid-portion thereof. This change which is in effect a partial restoration toward standard V-thread profile is indicated in FIG. 8. In this figure the standard V-shaped thread profile is shown and superimposed in solid line is the profile of the self locking formation 7 prior to use as shown in FIG. 4. Also shown in interrupted line is the profile assumed after a typical fastener has been driven and removed several times.

There are several ways in which the degree of self locking action contributed by the self locking formation 7 may be varied. One way is by changing the depth of penetration of the self locking formation which also tends to extend the arcuate length thereof. This change can be obtained by varying the extent to which the working surface 15 of the insert 12 protrudes in the die 10.

A second method of varying the degree of self locking action is obtainable by increasing or decreasing the size of the working surface or formation 15 on the insert 12. The larger this surface is made, the greater will be the deformation and conversely, the smaller it is made the smaller will be the displacement of material and less self locking action will be obtained.

Still another method of increasing the self locking action is to provide the threaded shank of the fastener with two or more self locking formations 7. Preferably these are axially spaced and may be in line or angularly displaced, as desired. The reason for this is that the self locking action is due in part to interference between the deformed surfaces 16 and 17 of the shank portions of the self locking formation and the opposing shanks of the female threads, and in part due to this interference creating a pressure between the reverse or opposite side of the shank and the opposed portion of the female fastener. Accordingly, by having the self locking formation on the same side of the shank, the opposite side of the shank is pressed firmly against the adjacent side of the female threads thereby creating friction and interference which resists loosening and inadvertent removal.

I claim:

1. A self-locking male threaded fastener having a shank portion with standard V-shaped threads formed thereon, axially aligned opposing flank portions of at least one pair of adjacent threads being deformed away from each other in opposed axial directions so as to have opposing mirror-image generally epicycloidal surfaces, each of said opposing surfaces being concave in axial direction and substantially longer in circumferential direction than deep in radial direction, the root portions of each of said surfaces terminating radially outwardly of the roots of said threads, said epicycloidal surfaces being arcuate in cross-section both in a direction parallel to the longitudinal axis of said shank and in a direction transverse to said axis, the radius of curvature in said first direction being one-half to one thread pitch and the radius of curvature in said second direction being greater than the major diameter of said threads.

2. The fastener called for in Claim 1 wherein there are a plurality of pairs of said epicycloidal concave surfaces which are axially spaced on said shank portion.